(12) United States Patent
Holtcamp (10) Patent No.: US 7,956,138 B2
(45) Date of Patent: Jun. 7, 2011

(54) CATALYST SYSTEM FOR OLEFIN POLYMERIZATION AND POLYMERS PRODUCED THEREFROM

(75) Inventor: Matthew William Holtcamp, Huffman, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 508 days.

(21) Appl. No.: 12/100,206

(22) Filed: Apr. 9, 2008

(65) Prior Publication Data

US 2008/0287617 A1    Nov. 20, 2008

Related U.S. Application Data

(60) Provisional application No. 60/930,443, filed on May 16, 2007.

(51) Int. Cl.
C08F 4/22 (2006.01)
C08F 4/44 (2006.01)

(52) U.S. Cl. ........ 526/104; 526/160; 526/943; 502/117; 502/113; 502/152; 502/155

(58) Field of Classification Search .................. 502/117, 502/113, 152, 155; 526/104, 160, 943
See application file for complete search history.

(56) References Cited

U.S. PATENT DOCUMENTS

| | | | |
|---|---|---|---|
| 2,356,128 A | 8/1944 | Thomas et al. | |
| 2,631,984 A | 3/1953 | Crawford et al. | |
| 2,825,721 A | 3/1958 | Hogan et al. | |
| 3,099,644 A | 7/1963 | Parker et al. | |
| 3,709,853 A | 1/1973 | Karapinka | |
| 3,968,076 A | 7/1976 | Gessler et al. | |
| 4,068,051 A | 1/1978 | Baldwin et al. | |
| 4,074,035 A | 2/1978 | Powers et al. | |
| 4,288,575 A | 9/1981 | Gardner | |
| 4,384,072 A | 5/1983 | Newman et al. | |
| 4,431,755 A | 2/1984 | Weber et al. | |
| 4,472,538 A | 9/1984 | Kamigaito et al. | |
| 4,474,924 A | 10/1984 | Powers et al. | |
| 4,513,116 A | 4/1985 | Kowalski et al. | |
| 4,554,326 A | 11/1985 | Kowalski et al. | |
| 4,632,963 A | 12/1986 | Gardner et al. | |
| 4,650,831 A | 3/1987 | Bond | |
| 4,681,921 A | 7/1987 | Gardner et al. | |
| 4,810,734 A | 3/1989 | Kawasumi et al. | |
| 4,889,885 A | 12/1989 | Usuki et al. | |
| 5,071,913 A | 12/1991 | Powers et al. | |
| 5,091,462 A | 2/1992 | Fukui et al. | |
| 5,162,425 A | 11/1992 | Sandstrom et al. | |
| 5,182,333 A | 1/1993 | Powers et al. | |
| 5,286,804 A | 2/1994 | Powers et al. | |
| 5,506,316 A | 4/1996 | Shaffer | |
| 5,532,312 A | 7/1996 | Gursky et al. | |
| 5,571,864 A | 11/1996 | Bates et al. | |
| 5,681,901 A | 10/1997 | Newman | |
| 5,723,399 A * | 3/1998 | Takemoto et al. ............ 502/113 |
| 5,910,523 A | 6/1999 | Hudson | |

| | | |
|---|---|---|
| 6,011,127 A | 1/2000 | Monoi et al. |
| 6,040,399 A | 3/2000 | Monoi et al. |
| 6,079,465 A | 6/2000 | Takeyama et al. |
| 6,228,978 B1 | 5/2001 | Agarwal et al. |
| 6,469,087 B1 | 10/2002 | Singh et al. |
| 6,528,596 B2 | 3/2003 | Takaoki et al. |
| 2006/0223941 A1 | 10/2006 | Tsou et al. |
| 2007/0060684 A1 | 3/2007 | Tsou et al. |

FOREIGN PATENT DOCUMENTS

| | | |
|---|---|---|
| DE | 26 53 667 | 5/1978 |
| DE | 197 26 278 | 6/1996 |
| EP | 0 279 456 | 8/1988 |
| EP | 0 678 529 | 10/1995 |
| EP | 0 722 850 | 7/1996 |
| EP | 0 755 929 | 1/1997 |
| EP | 0 763 550 | 3/1997 |
| EP | 0 857 761 | 8/1998 |
| EP | 0 969 039 | 1/2000 |
| EP | 1 114 832 | 7/2001 |

(Continued)

OTHER PUBLICATIONS

S. Wu, "Formation of Dispersed Phase in Incompatible Polymer Blends: Interfacial and Rheological Effects", Polymer Engineering and Science, mid-March, 1987, vol. 27, No. 5, pp. 335-343.

(Continued)

*Primary Examiner* — Ling-Siu Choi (57) ABSTRACT

This invention relates to a catalyst system comprising:
 an activator, such as an aluminum alkyl, alumoxane or combinations thereof;
 a first catalyst precursor prepared by contacting compound (I) represented by the formula:

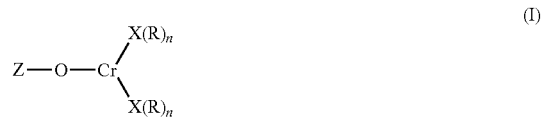

with an optionally substituted alkyl or optionally substituted aryl alcohol;
wherein
 Z—O is a support material, where O is oxygen and Z is Si, Ti, Al, Sn, Fe, Ga, Zr, B, Mg or Cr;
 each X is, independently, nitrogen, oxygen phosphorous, or sulfur, provided that both X's are not each oxygen;
 each n is, independently, 1 or 2, provided the total of n=3;
 each R is, independently, an alkyl group, a substituted alkyl group, an aryl group, or a substituted aryl group, provided at least one R group is an aryl or substituted aryl group; and
 a second catalyst precursor, wherein the second catalyst precursor is a metallocene compound.
This invention also relates to the use of the above catalyst system to polymerize olefins and other monomers.

27 Claims, 1 Drawing Sheet

FOREIGN PATENT DOCUMENTS

| | | |
|---|---|---|
| JP | 8-183683 | 7/1996 |
| JP | 8-193545 | 7/1996 |
| JP | 9-175150 | 7/1997 |
| JP | 10-235386 | 9/1998 |
| JP | 10-338707 | 12/1998 |
| JP | 11-92522 | 4/1999 |
| JP | 11-228620 | 8/1999 |
| JP | 11-310643 | 11/1999 |
| JP | 2000-109605 | 4/2000 |
| JP | 2000-109635 | 4/2000 |
| WO | WO 92/02582 | 2/1992 |
| WO | WO 98/53000 | 11/1998 |
| WO | WO 2004/058825 | 7/2004 |
| WO | WO 2004/058835 | 7/2004 |
| WO | WO 2006/011002 | 2/2006 |
| WO | WO 2007/050076 | 5/2007 |

OTHER PUBLICATIONS

Rubber Technology, pp. 209-581 (Maurice Morton ed., Chapman & Hall 1995).

The Vanderbilt Rubber Handbook, Robert F. Ohm ed., R.T. Vanderbilt Co., Inc., 1990, pp. 105-122.

Edward Kresge et al., Kirk-Othmer Encyclopedia of Chemical Technology, John Wiley & Sons, Inc., 4th ed., vol. 8, 1993, pp. 934-955.

Rubber Technology, pp. 179-374 (Maurice Morton ed., Chapman & Hall 1995).

The Vanderbilt Rubber Handbook, Commercial Elastomers, Chptr. 2, Robert F. Ohm ed., R.T. Vanderbilt Co., Inc., 1990, pp. 22-80.

"Structure Characterization, The Science and Technology of Elastomers," F. Eirich, editor, Academic Press 1978, Chapter 3 by G. Ver Strate.

Helt et al., Post Vulcanization Stabilization for NR, Rubber World, 1991, pp. 18-24.

Formulation Design and Curing Characteristics of NBR Mixes for Seals, Rubber World, Sep. 1993, pp. 25-30.

J.D. Fotheringham, Polybutenes, Leslie R. Rudnick & Ronald L. Shubkin, ed., Marcel Dekker, 1999, pp. 357-392.

M. Enders et al., New Chromium(III) Complexes as Highly Active Catalysts for Olefin Polymerization, Organometallics, 2001, vol. 20, pp. 5005-5007.

KH Theopold, Homogeneous Chromium Catalysts for Olefin Polymerization, Eur. J. Inorg. Chem., 1998, pp. 15-24.

R.N. Webb, T.D. Shaffer and A.H. Tsou, "Commercial Isobutylene Polymers," Encyclopedia of Polymer Science and Technology, 2002, John Wiley & Sons, Incorporated.

* cited by examiner

CATALYST SYSTEM FOR OLEFIN POLYMERIZATION AND POLYMERS PRODUCED THEREFROM

PRIORITY CLAIM

This application claims priority to U.S. Provisional Application No. 60/930,433, filed May 16, 2007.

CROSS REFERENCE TO RELATED APPLICATIONS

This application is related to U.S. Ser. No. 11/589,499, filed Oct. 30, 2006, which claims the benefit of and priority to U.S. Ser. No. 60/737,595, filed Nov. 17, 2005.

FIELD OF THE INVENTION

This invention relates to catalyst systems that include a chromium precursor, a metallocene precursor and an activator and processes to polymerize olefins using the catalyst systems. The invention also relates to the polymers produced therefrom.

BACKGROUND OF THE INVENTION

Olefin polymerization catalysts are of great use in industry. Hence there is great interest in finding new catalyst compounds, particularly compounds that can be easily supported and or modified by altering the ligands. There also exists the need to reduce catalyst costs by developing catalyst systems that are efficient utilizing simple alkyl aluminums rather than alumoxanes that are traditionally more expensive.

Silica supported chromium tris(amide)/alumoxane olefin polymerization catalysts are found in U.S. Pat. No. 6,040,399 where calcining at greater than 500° C. is disclosed to reduce polyethylene molecular weight (column 4, line 24). Further the U.S. Pat. No. 6,040,399 examples use Cr(III) tris(trimethylsilyamide) which may or may not react with the support and as noted they found only formation of oligomers if using silica calcined above 500° C. Further in U.S. Pat. No. 6,040,399, comparative example 4, describes a catalyst system with a supported Cr(III) tri(trimethylsilyamide) catalyst activated with triisobutylaluminum yielding an extremely low activity polymerization catalyst.

U.S. Pat. No. 6,011,127 discloses a process for making polyethylene comprising polymerizing ethylene in the presence of a supported catalyst comprising a chromium compound such as a chromium amide, an alumoxane, and an organometallic alkoxide.

U.S. Pat. No. 5,723,399 discloses an ethylenic polymerization catalyst comprising a chromium compound, a carrier, alumoxane, and a transition metal compound having a conjugated π (Pi) electron as a ligand, where in the chromium compound is not calcined.

U.S. Pat. No. 6,528,596, discloses a catalyst system prepared by contacting silica successively with biscyclopentadienylchromium (II), pentafluorophenol and ethylenebis(indenyl)zirconium dichloride without the use of an amide intermediate. The resultant polymers had a narrow polydispersity.

U.S. Pat. No. 5,723,399 describes polymerization of an olefin using various chromium compounds and a metallocene, but without pentafluorophenol. It provides comparative examples using a metallocene alone and various chromium compounds alone.

Additional references that are of interest include: JP-11092522 A2 (1999-Apr.-06); JP-11228620 (1999 Aug. 24); JP-10338707 (1998-Dec.-22); M. Enders et al., Organometallics, 2001, Vol. 20, pages 5005-5007; K. H. Theopold, Eur. J. Inorg. Chem., 1998, pages 15-24; U.S. Pat. Nos. 3,709,853; 2,825,721; 6,011,127; and 6,040,399.

SUMMARY OF THE INVENTION

This invention relates to a catalyst system comprising an aluminum alkyl, alumoxane or combinations thereof,
a first catalyst precursor prepared by contacting compound (I) represented by the formula:

$$Z-O-Cr\begin{matrix}X(R)_n\\X(R)_n\end{matrix} \qquad (I)$$

with an optionally substituted alkyl or optionally substituted aryl alcohol;
wherein
Z—O is a support material, where O is oxygen and Z is Si, Ti, Al, Sn, Fe, Ga, Zr, B, Mg or Cr;
each X is, independently, nitrogen, oxygen phosphorous, or sulfur, provided that both X's are not each oxygen;
each n is, independently, 1 or 2, provided the total of n=3;
each R is, independently, an alkyl group, a substituted alkyl group, an aryl group, or a substituted aryl group, provided at least one R group is an aryl or substituted aryl group; and
a second catalyst precursor, wherein the second catalyst precursor is a metallocene compound.

In one aspect, each X is a N in formula (I).
In the formula above, the Z is typically present in the form of a support and the chromium is bound to the support via at least one an oxygen atom.

In another aspect, the substituted aryl alcohol is a substituted phenol such as pentafluorophenol and is reacted with Z—O—Cr(NPh$_2$)$_3$ to form an intermediate having one or more pentafluorophenolic groups attached to the chromium metal center. In one embodiment, the substituted phenol is pentafluorophenol or perfluorobiphenol and each X is N.

Suitable metallocenes useful in the catalyst system include, for example, Me$_2$Si(H$_4$Ind)$_2$ZrMe$_2$, Me$_2$Si(1,3-Me, Bu-Cp)$_2$ZrMe$_2$, Me$_2$Si(2-Me-Ind)$_2$ZrMe$_2$ and Me$_2$Si(2-Me-4-Ph-Ind)$_2$Z-Me$_2$, where "Ind" is indenyl, Me is methyl, Bu is butyl, Cp is cyclopentadienyl and Ph is phenyl.

The invention also relates to a polymerization process using the above catalyst system in combination with one or more aluminum alkyl, alumoxane or combinations thereof, as activators to polymerize olefins. A suitable activator in the catalyst system is an aluminum alkyl, such as tri-n-octyl aluminum.

DETAILED DESCRIPTION OF THE INVENTION

For the purposes of this invention and the claims thereto when a polymer is referred to as comprising an olefin or other monomer, the olefin present in the polymer is the polymerized form of the olefin or other monomer, respectively. Likewise when catalyst components are described as comprising neutral stable forms of the components, it is well understood by one of ordinary skill in the art, that the active form of the component is the form that reacts with the monomers to produce polymers. In addition, a reactor is any container(s) in which a chemical reaction occurs.

As used herein, the new numbering scheme for the Periodic Table Groups is used as published in CHEMICAL AND ENGINEERING NEWS, 63(5), 27 (1985).

As used herein, the phrase "represented by the formula" is not intended to be limiting and is used in the same way that "comprising" is commonly used.

As used herein the term "alkyl" is used herein to refer to a branched or unbranched, saturated or unsaturated acyclic hydrocarbon radical. Suitable alkyl radicals include, for example, methyl, ethyl, n-propyl, i-propyl, 2-propenyl (or allyl), vinyl, n-butyl, t-butyl, i-butyl (or 2-methylpropyl), etc. In particular embodiments, alkyls have between 1 and 200 carbon atoms, between 1 and 50 carbon atoms or between 1 and 20 carbon atoms.

As used herein the term substituted means one or more hydrogen atom to any carbon is replaced by another group such as a halogen, aryl, substituted aryl, cycloalkyl, substituted cycloalkyl, and combinations thereof. Examples of substituted alkyls include methylbenzyl, trifluoromethyl and the like.

The term "aryl" is used herein to refer to an aromatic substituent, which may be a single aromatic ring or multiple aromatic rings, which are fused together, linked, covalently, or linked to a common group such as a methylene or ethylene moiety. The common linking group may also be a carbonyl as in benzophenone or oxygen as in diphenylether. The aromatic ring(s) may include phenyl, naphthyl, biphenyl, diphenylether, tolyl and benzophenone among others. In particular embodiments, aryls have between 6 and 200 carbon atoms, between 6 and 50 carbon atoms or between 6 and 20 carbon atoms.

"Substituted aryl" refers to aryl as just described in which one or more hydrogen atom to any carbon is replaced by one or more groups such as alkyl, substituted alkyl, cycloalkyl, substituted cycloalkyl, heterocycloalkyl, substituted heterocycloalkyl, halogen, alkylhalos (e.g., CFA hydroxy, phosphino, alkoxy, aryloxy, amino, thio and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone.

As used herein the term "silyl" refers to the $SiQ^1Q^2Q^3$ radical, where each of $Q^1$, $Q^2$, and $Q^3$ is independently selected from the group consisting of alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, amino, silyl and combinations thereof.

The term "amino" is used herein to refer to the group —$NQ^1Q^2$, where each of $Q^1$ and $Q^2$ is independently selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

This invention relates to new catalyst systems and to a method to polymerize olefins comprising contacting the new catalyst system described herein with a monomer. Preferred alkyl aluminums, used with the catalyst system, are represented by the formula: $AlR_3$ where each R is independently a linear cyclic or branched alkyl group. Alternatively, alumoxane(s) can be substituted for alkyl aluminum(s).

Catalyst Compounds

In the description herein the catalyst compound may be described as a catalyst precursor, a pre-catalyst compound or a transition metal compound, and these terms are used interchangeably. In the instant invention, the catalyst precursors include a supported chromium compound and a metallocene. A catalyst system is therefore, a combination of catalyst precursors and one or more activators.

In one aspect, catalyst precursors useful in this invention include those arylamide Cr(III) species on a support that are reacted (contacted) with an optionally substituted alkyl alcohol or an optionally substituted aryl alcohol. The amide preferably contains electron withdrawing groups such as phenyl, biphenyl, naphthyl, halogenated or partially halogenated aryls, etc.

The alkyl alcohol or aryl alcohol can be substituted with electron-withdrawing groups such as a fluorine atom, chlorine atom, bromine atom, iodine atom, and cyano, nitro, phenyl, acetyl, carbonyl, thionyl, sulfone and carboxyl groups.

In another embodiment a catalyst precursor of the invention is prepared by contacting compound (I) represented by the formula:

(I)

with an optionally substituted alkyl or aryl alcohol;
wherein
Cr is preferably in the 3+ valence state;
Z—O is a support material, where O is oxygen and Z is Si, Ti, Al, Sn, Fe, Ga, Zr, B, Mg or Cr;
each X is, independently, nitrogen, oxygen, phosphorous or sulfur, provided that each X is not oxygen;
each n is, independently, 1 or 2, provided the total of n=3;
each R is, independently, an alkyl group, a substituted alkyl group, an aryl group, or a substituted aryl group, provided at least one R group is an aryl or substituted aryl group.

For example the supported chromium compound is reacted with HX'R'n (where X' is O, S, or P, R' is the same as R above, and n is 1 or 2). Further, the amide Cr(III) species on the support may be reacted with other heteroatom containing ligands that contain an acidic hydrogen capable of liberating amine from the Cr species. For example, perfluorophenol or perfluorobiphenol were reacted with the diphenyl amide Cr(III) silica bound species. Diphenylamine was released into the solvent yielding a Cr perfluorophenoxy species. Thus a convenient route to vary the ligands of the chromium site on the support has been discovered.

Specific examples of the alcohols useful to combine with compound (I) include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1,1,3,3,3-hexafluoro-2-trifluoromethylpropanol, 1,1,1,3,3,3-hexachloro-2-trichloromethylpropanol, 1,1,1,3,3,3-hexabromo-2-tribromomethylpropanol, and 1,1,1,3,3,3-hexaiodo-2- triiodomethylpropanol. Thiol compounds in which an oxygen atom is substituted with a sulfur atom are also included. These thiol compounds are compounds wherein methanol is replaced with methanethiol, ethanol is replaced with ethanethiol and propanol is replaced with propanethiol, respectively.

Specific examples of the phenols useful to treat compound (I) include 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,6-difluorophenol, 3,5-difluorophenol, 2,6-dichlorophenol, 3,5-dichlorophenol, 2,6-dibromophenol, 3,5-dibromophenol, 2,6-diiodophenol, 3,5-diiodophenol, 2,4,6-trifluorophenol, 2,4,6-trichlorophenol, 2,4,6-tribromophenol, 2,4,6-triiodophenol, pentafluorophenol, pentachlorophenol, pentabromophenol, pentaiodophenol, 2-(trifluoromethyl)phenol, 3-(trifluoromethyl)phenol, 4-(trifluoromethyl)phenol, 2,6-di(trifluoromethyl)phenol, 3,5-di(trifluoromethyl)phenol, 2,4,6-tri(trifluoromethyl)phenol, 2-cyanophenol, 3-cyanophenol, 4-cyanophenol, 2-nitrophenol, 3-nitrophenol, and 4-nitrophenol. Thiophenol compounds in which an oxygen atom is substituted with a sulfur atom are also included.

In the formula above the Z is typically present in the form of a support and the chromium is bound to the support via at least one an oxygen atom.

In an alternate embodiment, each R is, independently, a substituted or unsubstituted C1 to C30 linear, branched or cyclic alkyl group or a substituted or unsubstituted C6 to C30 aryl group, preferably each R is, independently, at least one R group is an aryl or substituted aryl group, preferably a phenyl (substituted or unsubstituted), naphthyl (substituted or unsubstituted), biphenyl (substituted or unsubstituted), diphenylether (substituted or unsubstituted), tolyl (substituted or unsubstituted) or benzophenone (substituted or unsubstituted), methyl, ethyl, propyl, butyl, isobutyl, hexyl, isohexyl, octyl, cyclohexyl, dodecyl, or a mixture thereof. Preferred aryl or substituted aryl groups are selected from the group consisting of phenyl (substituted or unsubstituted), naphthyl (substituted or unsubstituted), biphenyl (substituted or unsubstituted), diphenylether (substituted or unsubstituted), tolyl(substituted or unsubstituted) or benzophenone (substituted or unsubstituted).

Alternately, each R is, independently, an alkyl group, a substituted alkyl group, an aryl group, or a substituted aryl group, provided at least one R group is an aryl or substituted aryl group.

In a preferred embodiment in the above formula, both X groups are N, n is 2 and each R is selected from the group consisting of phenyl (substituted or unsubstituted), naphthyl (substituted or unsubstituted), biphenyl (substituted or unsubstituted), diphenylether (substituted or unsubstituted), tolyl (substituted or unsubstituted), or benzophenone (substituted or unsubstituted), preferably each R group is selected from the group consisting of naphthyl, phenyl, biphenyl, fluorophenyl, and tolyl.

In a preferred embodiment in the above formula, one X is N, the other X is O, each n is 2 and each R is selected from the group consisting of phenyl (substituted or unsubstituted), naphthyl (substituted or unsubstituted), biphenyl (substituted or unsubstituted), diphenylether (substituted or unsubstituted), tolyl (substituted or unsubstituted) or benzophenone (substituted or unsubstituted) phenyl, preferably each R group is selected from the group consisting of naphthyl, phenyl, biphenyl, fluorophenyl, and tolyl.

Metallocene Compounds

For purposes of this invention and the claims thereto, the terms "hydrocarbyl radical," "hydrocarbyl," and hydrocarbyl group" are used interchangeably throughout this document. Likewise the terms "group," "radical," and "substituent" are also used interchangeably throughout this document. For purposes of this disclosure, "hydrocarbyl radical" is defined to be a $C_1$-$C_{100}$ radical and may be linear, branched, or cyclic. When cyclic, the hydrocarbon radical may be aromatic or non-aromatic. "Hydrocarbon radical" is defined to include substituted hydrocarbyl radicals, halocarbyl radicals, substituted halocarbyl radicals, silylcarbyl radicals, and germylcarbyl radicals as these terms are defined below. Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^5_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of groups 1-17 of the periodic table (except carbon and hydrogen) either alone or connected to other elements by covalent bonds or other interactions such as ionic bonds, van der Waals forces, or hydrogen bonding. Examples of functional heteroatom containing groups include carboxylic acids, acid halides, carboxylic esters, carboxylic salts, carboxylic anhydrides, aldehydes and their chalcogen (Group 14) analogues, alcohols and phenols, ethers, peroxides and hydroperoxides, carboxylic amides, hydrazides and imides, amidines and other nitrogen analogues of amides, nitriles, amines and imines, azos, nitros, other nitrogen compounds, sulfur acids, selenium acids, thiols, sulfides, sulfoxides, sulfones, phosphines, phosphates, other phosphorus compounds, silanes, boranes, borates, alanes, aluminates. Functional groups may also be taken broadly to include organic polymer supports or inorganic support material such as alumina, and silica. Preferred examples of polar groups include $NR*_2$, $OR*$, $SeR*$, $TeR*$, $PR*_2$, $AsR*_2$, $SbR*_2$, $SR*$, $BR*_2$, $SnR*_3$, $PbR*_3$ and the like where $R*$ is independently a hydrocarbyl, substituted hydrocarbyl, halocarbyl or substituted halocarbyl radical as defined above and two $R*$ may join together to form a substituted or unsubstituted saturated, partially unsaturated or aromatic cyclic or polycyclic ring structure.

In using the terms "substituted or unsubstituted cyclopentadienyl ligand", "substituted or unsubstituted indenyl ligand", "substituted or unsubstituted fluorenyl ligand" and "substituted or unsubstituted tetrahydroindenyl ligand", the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands, heterofluorenyl ligands, or heterotetrahydroindenyl ligands, each of which can additionally be substituted or unsubstituted.

In some embodiments, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Examples of cyclopentadienyl and indenyl ligands are illustrated below as part of the ligands.

A "ring carbon atom" is a carbon atom that is part of a cyclic ring structure. By this definition, an indenyl ligand has nine ring carbon atoms; a cyclopentadienyl ligand has five ring carbon atoms and a fluorenyl ligand has 13 carbon atoms. Thus an indene is equivalent to a Cp ring with two alkyl radical substituents and a fluorene is equivalent to a Cp ring with four alkyl radical substituents. In addition, the cyclic ring can also be hydrogenated, for example, di-hydro- or tetra-hydro-indenyl ligand, di-hydro, tetra-hydro or octa-hydro-fluorenyl ligands are suitable.

The metallocene compounds (also referred to as metallocene, metallocene catalyst precursor, or catalyst precursors), useful herein are preferably cyclopentadienyl derivatives of titanium, zirconium and hafnium. In general, useful titanocenes, zirconocenes and hafnocenes may be represented by the following formulae:

(II)

wherein:

M is the metal center, and is a Group 4 metal preferably titanium, zirconium or hafnium, preferably zirconium or hafnium;

A is an optional bridging group which if present, in preferred embodiments is selected from dialkylsilyl, dialkylmethyl, ethylenyl (—$CH_2$—$CH_2$—), alkylethylenyl (—$CR_2$—$CR_2$—), where alkyl can be independently C1 to C16 alkyl radical or phenyl, tolyl, xylyl radical and the like, and when A is bridged, the catalyst represented can be a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl optionally substituted rings, in which any two adjacent R groups on the rings are optionally joined to form a substituted or unsubstituted, saturated, partially unsaturated, or aromatic cyclic or polycyclic substituent;

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

The following are representative constituent moieties for the meso-metallocene components of formula (II). The list is for illustrative purposes only and should not be construed to be limiting in any way. A number of final components may be formed by permuting all possible combinations of the constituent moieties with each other. When hydrocarbyl radicals including alkyl, alkenyl, alkynyl, cycloalkyl, cycloalkenyl, cycloalkynyl and aromatic radicals are disclosed in this application the term includes all isomers. For example, butyl includes n-butyl, 2-methylpropyl, tert-butyl, and cyclobutyl; pentyl includes n-pentyl, 1-methylbutyl, 2-methylbutyl, 3-methylbutyl, 1-ethylpropyl, neopentyl, cyclopentyl and methylcyclobutyl; butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl. This includes when a radical is bonded to another group, for example, propylcyclopentadienyl include n-propylcyclopentadienyl, isopropylcyclopentadienyl and cyclopropylcyclopentadienyl.

In general, the ligands or groups noted in the following section include all isomeric forms. For example, dimethylcyclopentadienyl includes 1,2-dimethylcyclopentadienyl and 1,3-dimethylcyclopentadienyl; methylindenyl includes 1-methylindenyl, 2-methylindenyl, 3-methylindenyl, 4-methylindenyl, 5-methylindenyl, 6-methylindenyl and 7-methylindenyl; methylethylphenyl includes ortho-methylethylphenyl, meta-methylethylphenyl and para-methylethylphenyl. To illustrate members of the transition metal component, select any combination of the species listed as follows. These include one of titanium, zirconium and hafnium as the metal component and two of the ligands that follow:

methylcyclopentadienyl, dimethylcyclopentadienyl, trimethylcyclopentadienyl, tetramethylcyclopentadienyl, ethylcyclopentadienyl, diethylcyclopentadienyl, propylcyclopentadienyl, dipropylcyclopentadienyl, butylcyclopentadienyl, dibutylcyclopentadienyl, pentylcyclopentadienyl, dipentylcyclopentadienyl, hexylcyclopentadienyl, dihexylcyclopentadienyl, heptylcyclopentadienyl, diheptylcyclopentadienyl, octylcyclopentadienyl, dioctylcyclopentadienyl, nonylcyclopentadienyl, dinonylcyclopentadienyl, decylcyclopentadienyl, didecylcyclopentadienyl, undecylcyclopentadienyl, dodecylcyclopentadienyl, tridecylcyclopentadienyl, tetradecylcyclopentadienyl, pentadecylcyclopentadienyl, hexadecylcyclopentadienyl, heptadecylcyclopentadienyl, octadecylcyclopentadienyl, nonadecylcyclopentadienyl, eicosylcyclopentadienyl, heneicosylcyclopentadienyl, docosylcyclopentadienyl, tricosylcyclopentadienyl, tetracosylcyclopentadienyl, pentacosylcyclopentadienyl, hexacosylcyclopentadienyl, heptacosylcyclopentadienyl, octacosylcyclopentadienyl, nonacosylcyclopentadienyl, triacontylcyclopentadienyl, cyclohexylcyclopentadienyl, phenylcyclopentadienyl, diphenylcyclopentadienyl, triphenylcyclopentadienyl, tetraphenylcyclopentadienyl, tolylcyclopentadienyl, benzylcyclopentadienyl, phenethylcyclopentadienyl, cyclohexylmethylcyclopentadienyl, napthylcyclopentadienyl, methylphenylcyclopentadienyl, methyltolylcyclopentadienyl, methylethylcyclopentadienyl, methylpropylcyclopentadienyl, methylbutylcyclopentadienyl, methylpentylcyclopentadienyl, methylhexylcyclopentadienyl, methylheptylcyclpentadienyl, methyloctylcyclopentadienyl, methylnonylcyclopentadienyl, methyldecylcyclopentadienyl, vinylcyclopentadienyl, propenylcyclopentadienyl, butenylcyclopentadienyl, indenyl, methylindenyl, dimethylindenyl, trimethylindenyl, tetramethylindenyl, pentamethylindenyl, methylpropylindenyl, dimethylpropylindenyl, methyldipropylindenyl, methylethylindenyl, methylbutylindenyl, ethylindenyl, propylindenyl, butylindenyl, pentylindenyl, hexylindenyl, heptylindenyl, octylindenyl, nonylindenyl, decylindenyl, phenylindenyl, (fluorophenyl)indenyl, (methylphenyl)indenyl, biphenylindenyl, (bis(trifluoromethyl)phenyl)indenyl, napthylindenyl, phenanthrylindenyl, benzylindenyl, benzindenyl, cyclohexylindenyl, methylphenylindenyl, ethylphenylindenyl, propylphenylindenyl, methylnapthylindenyl, ethylnapthylindenyl, propylnapthylindenyl, (methylphenyl)indenyl, (dimethylphenyl)indenyl, (ethylphenyl)indenyl, (diethylphenyl)indenyl, (propylphenyl)indenyl, (dipropylphenyl)indenyl, tetrahydroindenyl, methyltetrahydroindenyl, ethyltetrahydroindenyl, propyltetrahydroindenyl, butyltetrahydroindenyl, phenyltetrahydroindenyl, fluorenyl, tetrahydrofluorenyl, octahydrofluorenyl, alkyl or silyl substituted fluorenyl or hydrofluoroenyl, (diphenylmethyl)cyclopentadienyl, trimethylsilylcyclopentadienyl, triethylsilylcyclopentadienyl, trimethylgermylcyclopentadienyl, trifluoromethylcyclopentadienyl, cyclopenta[b]thienyl, cyclopenta[b]furanyl, cyclopenta[b]selenophenyl, cyclopenta[b]tellurophenyl, cyclopenta[b]pyrrolyl, cyclopenta[b]phospholyl, cyclopenta[b]arsolyl, cyclopenta[b]stibolyl, methylcyclopenta[b]thienyl, methylcyclopenta[b]furanyl, methylcyclopenta[b]selenophenyl, methylcyclopenta[b]tellurophenyl, methylcyclopenta[b]pyrrolyl, methylcyclopenta[b]phospholyl, methylcyclopenta[b]arsolyl, methylcyclopenta[b]stibolyl, dimethylcyclopenta[b]thienyl, dimethylcyclopenta[b]furanyl, dimethylcyclopenta[b]pyrrolyl, dimethylcyclopenta[b]phospholyl, trimethylcyclopenta[b]thienyl, trimethylcyclopenta[b]furanyl, trimethylcyclopenta[b]pyrrolyl, trimethylcyclopenta[b]phospholyl, ethylcyclopenta[b]thienyl, ethylcyclopenta[b]furanyl, ethylcyclopenta[b]pyrrolyl, ethylcyclopenta[b]phospholyl, diethylcyclopenta[b]thienyl, diethylcyclopenta[b]furanyl, diethylcyclopenta[b]pyrrolyl, diethylcyclopenta[b]phospholyl, triethylcyclopenta[b]thienyl, triethylcyclopenta[b]furanyl, triethylcyclopenta[b]pyrrolyl, triethylcyclopenta[b]phospholyl, propylcyclopenta[b]thienyl, propylcyclopenta[b]furanyl, propylcyclopenta[b]pyrrolyl, propylcyclopenta[b]phospholyl, dipropylcyclopenta[b]thienyl, dipropylcyclopenta[b]furanyl, dipropylcyclopenta[b]pyrrolyl, dipropylcyclopenta[b]phospholyl, tripropylcyclopenta[b]thienyl, tripropylcyclopenta[b]furanyl, tripropylcyclopenta[b]pyrrolyl, tripropylcyclopenta[b]phospholyl, butylcyclopenta[b]thienyl, butylcyclopenta[b]furanyl, butylcyclopenta[b]pyrrolyl, butylcyclopenta[b]phospholyl, dibutylcyclopenta[b]thienyl, dibutylcyclopenta[b]furanyl, dibutylcyclopenta[b]pyrrolyl, dibutylcyclopenta[b]phospholyl, tributylcyclopenta[b]thienyl, tributylcyclopenta[b]furanyl, tributylcyclopenta[b]pyrrolyl, tributylcyclopenta[b]phospholyl, ethylmethylcyclopenta[b]thienyl, ethylmethylcyclopenta[b]furanyl, ethylmethylcyclopenta[b]pyrrolyl, ethylmethylcyclopenta[b]phospholyl, methylpropylcyclopenta[b]thienyl, methylpropylcyclopenta[b]furanyl, methylpropylcyclopenta[b]pyrrolyl, methylpropylcyclopenta[b]phospholyl, butylmethylcyclopenta[b]thienyl, butylmethylcyclopenta[b]furanyl, butylmethylcyclopenta[b]pyrrolyl, butylmethylcyclopenta[b]phospholyl, cyclopenta[c]thienyl, cyclopenta[c]furanyl, cyclopenta[c]selenophenyl, cyclopenta[c]tellurophenyl, cyclopenta[c]pyrrolyl, cyclopenta[c]phospholyl, cyclopenta[c]arsolyl, cyclopenta[c]stibolyl, methylcyclopenta[c]thienyl, methylcyclopenta[c]furanyl, methylcyclopenta[c]selenophenyl, methylcyclopenta[c]tellurophenyl, methylcyclopenta[c]pyrrolyl, methylcyclopenta

[c]phospholyl, methylcyclopenta[c]arsolyl, methylcyclopenta[c]stibolyl, dimethylcyclopenta[c]thienyl, dimethylcyclopenta[c]furanyl, dimethylcyclopenta[c]pyrrolyl, dimethylcyclopenta[c]phospholyl, trimethylcyclopenta[c]thienyl, trimethylcyclopenta[c]furanyl, trimethylcyclopenta[c]pyrrolyl, trimethylcyclopenta[c]phospholyl, ethylcyclopenta[c]thienyl, ethylcyclopenta[c]furanyl, ethylcyclopenta[c]pyrrolyl, ethylcyclopenta[c]phospholyl, diethylcyclopenta[c]thienyl, diethylcyclopenta[c]furanyl, diethylcyclopenta[c]pyrrolyl, diethylcyclopenta[c]phospholyl, triethylcyclopenta[c]thienyl, triethylcyclopenta[c]furanyl, triethylcyclopenta[c]pyrrolyl, triethylcyclopenta[c]phospholyl, propylcyclopenta[c]thienyl, propylcyclopenta[c]furanyl, propylcyclopenta[c]pyrrolyl, propylcyclopenta[c]phospholyl, dipropylcyclopenta[c]thienyl, dipropylcyclopenta[c]furanyl, dipropylcyclopenta[c]pyrrolyl, dipropylcyclopenta[c]phospholyl, tripropylcyclopenta[c]thienyl, tripropylcyclopenta[c]furanyl, tripropylcyclopenta[c]pyrrolyl, tripropylcyclopenta[c]phospholyl, butylcyclopenta[c]thienyl, butylcyclopenta[c]furanyl, butylcyclopenta[c]pyrrolyl, butylcyclopenta[c]phospholyl, dibutylcyclopenta[c]thienyl, dibutylcyclopenta[c]furanyl, dibutylcyclopenta[c]pyrrolyl, dibutylcyclopenta[c]phospholyl, tributylcyclopenta[c]thienyl, tributylcyclopenta[c]furanyl, tributylcyclopenta[c]pyrrolyl, tributylcyclopenta[c]phospholyl, ethylmethylcyclopenta[c]thienyl, ethylmethylcyclopenta[c]furanyl, ethylmethylcyclopenta[c]pyrrolyl, ethylmethylcyclopenta[c]phospholyl, methylpropylcyclopenta[c]thienyl, methylpropylcyclopenta[c]furanyl, methylpropylcyclopenta[c]pyrrolyl, methylpropylcyclopenta[c]phospholyl, butylmethylcyclopenta[c]thienyl, butylmethylcyclopenta[c]furanyl, butylmethylcyclopenta[c]pyrrolyl, butylmethylcyclopenta[c]phospholyl, pentamethylcyclopentadienyl, tetrahydroindenyl, methyltetrahydroindenyl and dimethyltetrahydroindenyl.

Activators and Activation Methods for Catalyst Compounds

The catalyst compounds, described above, are typically activated in various ways to yield compounds having an alkyl group and a vacant coordination site that will coordinate, insert, and polymerize olefin(s) or other monomers. For the purposes of this patent specification and appended claims, the terms "cocatalyst" and "activator" are used herein interchangeably and are defined to be any compound which can activate any one of the catalyst compounds described above by converting the catalyst compound to a catalytically active catalyst compound. Non-limiting activators, for example, include aluminum alkyls, alumoxanes and combinations thereof.

Aluminum Alkyl Activators

Aluminum alkyl activators are typically those represented by the formula Al(R")$_3$, where each R" is, independently, a C1 to C30 alkyl group, preferably C1 to C20 linear or branched alkyl group, more preferably each R" is selected from the group consisting of methyl, ethyl, propyl, butyl, pentyl, hexyl, octyl, nonyl, decyl, undecyl, dodecyl, (including all isomers thereof, such as isobutyl, isooctyl, etc.) particularly preferred aluminum alkyl activators include trimethylaluminum, triethylaluminum, tri-n-butylaluminum, triisobutylaluminum, tri-n-hexylaluminum, tri-n-octylaluminum and the like.

When the activator is a alkyl aluminum some embodiments select the maximum amount of activator at a 5000-fold molar excess Al/metal (such as Cr) over the catalyst precursor (per metal catalytic site). The minimum activator-to-catalyst-precursor is a 1:1 molar ratio. In general the catalyst precursors and the activators are combined in molar ratios of about 1:10,000 to about 10:1, alternatively from 1:5000 to 10:1, alternatively from 1:1000 to 10:1; alternatively, 1:500 to 2:1; or 1:300 to 1:1. Multiple activators may be used, including using mixes of different aluminum alkyls or alumoxanes.

Alternatively, chromium to aluminum ratios are about 1 to 20. Preferred amounts may be anywhere from 1:1 to 1:5,000 depending on reactor, conditions, and desired properties.

Alumoxane Activators

The alumoxane component useful as an activator typically is preferably an oligomeric aluminum compound represented by the general formula (R$^x$—Al—O)$_n$, which is a cyclic compound, or R$^x$ (R$^x$—Al—O)$_n$AlR$^x_2$, which is a linear compound. Most common alumoxane is a mixture of the cyclic and linear compounds. In the general alumoxane formula, R$^x$ is independently a C1-C20 alkyl radical, for example, methyl, ethyl, propyl, butyl, pentyl, isomers thereof, and the like, and "n" is an integer from 1-50. Most preferably, R$^x$ is methyl and "n" is at least 4. Methyl alumoxane and modified methyl alumoxanes are most preferred. For further descriptions see, EP 0 279 586, EP 0 594 218, EP 0 561 476, WO94/10180 and U.S. Pat. Nos. 4,665,208; 4,874,734; 4,908,463; 4,924,018; 4,952,540; 4,968,827; 5,041,584; 5,091,352; 5,103,031; 5,157,137; 5,204,419; 5,206,199; 5,235,081; 5,248,801; 5,329,032; 5,391,793; and 5,416,229.

When an alumoxane or modified alumoxane is used, the catalyst-precursor-to-activator molar ratio (based on the metals, e.g., Zr or Hf to Al or Cr) is from about 1:3000 to 10:1; alternatively, 1:2000 to 10:1; alternatively 1:1000 to 10:1; alternatively, 1:500 to 1:1; alternatively 1:300 to 1:1; alternatively 1:250 to 1:1, alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000 fold molar excess over the catalyst precursor (per metal catalytic site). The preferred minimum activator to catalyst precursor ratio is 1:1 molar ratio.

Supports

Preferably the catalyst systems of this invention include a support material or carrier. The support material is any of the conventional support materials. Preferably the supported material is a porous support material, for example, talc, and inorganic oxides. Other support materials include zeolites, clays, organoclays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Particularly useful supports include magnesia, titania, zirconia, montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 µm. More preferably, the surface area of the support material is in the range of from about 50 to about 500 m$^2$/g, pore volume of from about 0.5 to about 3.5 cc/g and average particle size of from about 10 to about 200 µm. Most preferably the surface area of the support material is in the range is from about 100 to about 400 m$^2$/g, pore volume from about 0.8 to about 3.0 cc/g and average particle size is from about 5 to about 100 µm. The average pore size of the carrier useful in the invention typically has pore size in the range of from 10 to 1000 Å, preferably 50 to about 500 Å, and most preferably 75 to about 350 Å.

In another embodiment the support may comprise one or more types of support material, which may be treated differently. For example one could use two different silicas that had different pore volumes or had been calcined at different temperatures. Likewise one could use a silica that had been treated with a scavenger or other additive and a silica that had not.

Preferably the supports have been calcined at temperatures above 500° C., preferably above 550° C., preferably at 600° C. or above, preferably above 650° C., preferably at 700° C. or above, preferably above 750° C., preferably at 800° C. or above.

In an alternate embodiment, the supports have been calcined at temperatures above 200° C., preferably above 300° C., preferably at 400° C. or above.

In another embodiment, the supports have not been calcined.

The process of loading the chromium precursor on the support material involves combining the support and catalyst at elevated temperatures (such as 60° C. or above, or 100° C. or above). The amount of precursor loaded on the support is based on the amount of reactive moieties on the surface of the support and the desired degree of loading. Catalyst precursor loading can range from no load (no catalyst) to excess (100% loading). The chromium precursor complex is dissolved in a non-donor solvent, such as fluorobenzene, toluene or hexanes, to which the support material is added. This mixture is typically heated at a temperature between 25° C. and 200° C. for 5 hours to 48 hours. On completion of the reaction, the supported catalyst precursor can be separated from any byproducts by filtration and used as is, or reacted further. More specifically the process can involve combining equimolar amounts of the chromium (III) diphenylamide catalyst and silica (previously calcined at 600° C.), in toluene at the elevated temperature of 100° C. overnight. The supported chromium (III) diphenylamide precursor catalyst is then washed with toluene, filtered, and dried for further use or modification. Similar reaction conditions are used when replacing an X(R)n group with an HX'R'n group. Metallocene compound is loaded on the support by methods known in the Art.

Monomers

The catalyst systems described herein can be used for the polymerization of one or more of monomers. Typical monomers include monomers having from 2 to 30 carbon atoms, preferably 2-12 carbon atoms, and more preferably 2 to 8 carbon atoms. Useful monomers include linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Preferred monomers include one or more of ethylene, propylene, butene-1, pentene-1,4-methyl-pentene-1, hexene-1, octene-1, decene-1,3-methyl-pentene-1, norbornene, norbornadiene, vinyl norbornene, ethylidene norbornene monomers.

In a particularly preferred embodiment the process of this invention relates to the homopolymerization of ethylene or the copolymerization of ethylene with at least one comonomer having from 4 to 8 carbon atoms, preferably 4 to 7 carbon atoms. Particularly, the comonomers are butene-1,4-methyl-pentene-1,3-methyl-pentene-1, hexene-1 and octene-1, the most preferred being hexene-1, butene-1 and octene-1.

In another particularly preferred embodiment the polymer produced herein is a propylene homopolymer or copolymer. The comonomer of the copolymer is preferably a C4 to C20 linear, branched or cyclic monomer, and in one embodiment is a C4 to C12 linear or branched alpha-olefin, preferably ethylene, butene, pentene, hexene, heptene, octene, nonene, decene, dodecene, 4-methyl-pentene-1,3-methyl pentene-1, 3,5,5-trimethyl-hexene-1, and the like. In an alternate embodiment, ethylene is present at 5 mol % or less.

In another embodiment the polymer produced herein is a homopolymer or copolymer of one or more linear or branched C3 to C30 prochiral alpha-olefins or C5 to C30 ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In another embodiment, the monomer to be polymerized comprises aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also useful monomers herein. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

Polymerization Processes

The catalysts and catalyst systems described above are suitable for use in a solution, bulk, gas or slurry polymerization process or a combination thereof, preferably solution phase or bulk phase polymerization process. Preferably the process is a continuous process. By continuous is meant a system that operates (or is intended to operate) without interruption or cessation. For example, a continuous process to produce a polymer would be one where the reactants are continually introduced into one or more reactors and polymer product is continually withdrawn.

In one embodiment, this invention is directed toward the solution, bulk, slurry or gas phase polymerization reactions involving the polymerization of one or more of monomers having from 3 to 30 carbon atoms, preferably 3-12 carbon atoms, and more preferably 3 to 8 carbon atoms. Preferred monomers include one or more of propylene, butene-1, pentene-1,4-methyl-pentene-1, hexene-1, octene-1, decene-1,3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers. Preferably a homopolymer or copolymer of propylene is produced. In another embodiment, both a homopolymer of propylene and a copolymer of propylene and one or more of the monomers listed above are produced.

One or more reactors in series or in parallel may be used in the present invention. Catalyst precursor and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722, and WO0130862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst compounds can be added to the first reactor in the series. The catalyst component may also be added to both reactors, with one component being added to first reaction and another component to other reactors.

In one embodiment 500 ppm or less of hydrogen is added to the polymerization, or 400 ppm or less, or 300 ppm or less. In other embodiments at least 50 ppm of hydrogen is added to the polymerization, or 100 ppm or more, or 150 ppm or more.

Gas Phase Polymerization

Generally, in a fluidized gas bed process useful herein for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst system are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is fully incorporated herein by reference.

In another embodiment, the slurry process is carried out continuously in a loop reactor. The catalyst system, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

Preferably, the reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process useful in the invention is capable of and the process useful in the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process useful in the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process useful in the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process useful in the invention the concentration of predominant monomer in the reactor liquid medium is in the range of from about 1 to 10 weight percent, preferably from about 2 to about 7 weight percent, more preferably from about 2.5 to about 6 weight percent, most preferably from about 3 to about 6 weight percent.

Homogeneous, Bulk, or Solution Phase Polymerization

The catalyst systems described herein can be used advantageously in homogeneous solution processes. Generally this involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 160° C., more preferably from about 90° C. to about 150° C., and most preferably from about 100° C. to about 140° C. Polymerization temperature may vary depending on catalyst choice. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

In one embodiment 500 ppm or less of hydrogen is added to the polymerization, or 400 ppm or less or 300 ppm or less. In other embodiments at least 50 ppm of hydrogen is added to the polymerization, or 100 ppm or more, or 150 ppm or more.

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

In an alternate embodiment, the diluent or solvent may comprise fluorinated hydrocarbons. Fluorinated hydrocarbons are defined to be compounds consisting essentially of at least one carbon atom and at least one fluorine atom, and optionally at least one hydrogen atom. A perfluorinated carbon is a compound consisting essentially of carbon atom and fluorine atom, and includes for example linear branched or cyclic, $C_1$ to $C_{40}$ perfluoroalkanes, preferably $C_{11}$ to $C_{40}$ perfluoroalkanes. In one embodiment, the fluorinated hydrocarbons are represented by the formula:

$$C_xH_yF_z$$

wherein x is an integer from 1 to 40, preferably from 1 to 30, more preferably from 1 to 20, even more preferably from 1 to 10, and still even more preferably from 1 to 6, alternatively x is an integer from 2 to 20, preferably from 3 to 10, more preferably from 3 to 6, and most preferably from 1 to 3, and wherein y is greater than or equal 0 and z is an integer and at least one, more preferably, y and z are integers and at least one.

In one embodiment, a mixture of fluorinated hydrocarbons are used as the solvent or diluent in the process of the invention, preferably a mixture of a perfluorinated carbon and a fluorinated hydrocarbon, and more preferably a mixture of fluorinated hydrocarbons. In yet another embodiment, the fluorinated hydrocarbon is balanced or unbalanced in the number of fluorine atoms in the fluorinated hydrocarbon compound. Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3- pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred fluorinated hydrocarbons include difluoromethane, trifluoromethane, 1,1-difluoroethane, 1,1,1-trifluoroethane, fluoromethane, and 1,1,1,2-tetrafluoroethane. In addition to those fluorinated hydrocarbons described herein, those fluorinated hydrocarbons described in Raymond Will, et. al., CEH Marketing Report, Fluorocarbons, pages 1-133, by the Chemical Economics Handbook-SRI International, April 2001, which is fully incorporated herein by reference, are included.

Polymer Products

The polymers produced herein include homopolymer and copolymers of ethylene and or propylene with optional other monomers.

The polymers of the invention have an Mw (weight average molecular weight) of between about 100,000 and about 1,000,000, preferably between about 100,000 and about 700,000, preferably between about 200,000 and about 500,000, preferably between about 150,000 to about 450,000, and preferably between about 200,000 and about 400,000 g/mol.

The polymers described herein preferably have an Mn (number average molecular weight) of less than 15,000 preferably between about 4,000 and about 15,000, preferably between about 4,000 and about 11,000 and preferably between 5,000 and 10,000 g/mol.

The polymers described herein preferably have an Mw/Mn (polydispersity, PDI) of greater than 12 and less than 50, preferably between about 15 and about 50, preferably between about 20 and about 47, preferably between about 22 and about 47.

For purposes of this invention and the claims herein, MWD is equal to Mw/Mn.

In a preferred embodiment the polymer produced comprises at least 50 weight % propylene, preferably at least 60% propylene, alternatively at least 70% propylene, alternatively at least 80% propylene.

In another preferred embodiment the polymer produced comprises at least 50 weight % ethylene, preferably at least 60% ethylene, alternatively at least 70% ethylene, alternatively at least 80% ethylene.

The polymers produced by the process of the invention are useful in making a wide variety of products and useful in many end-use applications. The polymers produced by the process of the invention include linear low density polyethylenes, elastomers, plastomers, high density polyethylenes, low density polyethylenes, polypropylene and polypropylene copolymers.

The polymers produced, typically ethylene based polymers, generally have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc.

Polymers produced by the process of the invention are useful in such forming operations as film, sheet, and fiber extrusion and co-extrusion as well as blow molding, injection molding and rotary molding. Films include blown or cast films formed by coextrusion or by lamination, shrink film, cling film, stretch film, sealing films, oriented films. The films are useful in snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

The following paragraphs enumerated consecutively from 1 through 37 provide for various aspects of the present invention. In one embodiment, in a first paragraph:

1. A catalyst system includes:

an aluminum alkyl, alumoxane or combinations thereof;

a first catalyst precursor prepared by contacting compound (I) represented by the formula:

with an optionally substituted alkyl or optionally substituted aryl alcohol;

wherein

Z—O is a support material, where O is oxygen and Z is Si, Ti, Al, Sn, Fe, Ga, Zr, B, Mg or Cr;

each X is, independently, nitrogen, oxygen phosphorous, or sulfur, provided that both X's are not each oxygen;

each n is, independently, 1 or 2, provided the total of n=3;

each R is, independently, an alkyl group, a substituted alkyl group, an aryl group, or a substituted aryl group, provided at least one R group is an aryl or substituted aryl group; and a second catalyst precursor, wherein the second catalyst precursor is a metallocene compound.

2. The catalyst system of paragraph 1, wherein each X is N.
3. The catalyst system of either paragraphs 1 or 2, wherein each R is, independently, methyl, ethyl, propyl, butyl, isobutyl, hexyl, isohexyl, octyl, cyclohexyl, dodecyl, phenyl, substituted phenyl, naphthyl, substituted naphthyl, biphenyl, substituted biphenyl, diphenylether, substituted diphenylether, tolyl, substituted tolyl, benzophenone, substituted benzophenone, or a mixture thereof.
4. The catalyst system of either paragraphs 1 or 2, wherein each R is, independently, phenyl, substituted phenyl, naphthyl, substituted naphthyl, biphenyl, substituted biphenyl, diphenylether, substituted diphenylether, tolyl, substituted tolyl, benzophenone or substituted benzophenone.
5. The catalyst system of either paragraphs 1 or 2, wherein each R is, independently, phenyl, substituted phenyl, naphthyl, or substituted naphthyl.
6. The catalyst system of any of paragraphs 1 to 5, wherein the alkyl alcohol or aryl alcohol is substituted with one or more electron withdrawing groups.
7. The catalyst system of paragraph 6, wherein the aryl alcohol is phenol or biphenol and the phenol or biphenol is substituted with one or more fluorine atoms.
8. The catalyst system of paragraph 7, wherein the substituted biphenol is —OC$_6$F$_4$C$_6$F$_5$.
9. The catalyst system of any of paragraphs 1 to 8, wherein the alkyl alcohol or aryl alcohol is present in a molar excess.
10. The catalyst system of any of paragraphs 1 to 10, wherein the aluminum alkyl is represented by the formula Al(R")$_3$, where each R" is, independently, a C1 to C30 alkyl group.
11. The catalyst system of paragraph 10, wherein each R" is, independently, selected from the group consisting of methyl, ethyl, propyl, butyl, pentyl, hexyl, octyl, nonyl, decyl, undecyl, dodecyl, and all isomers thereof.
12. The catalyst system of any of paragraphs 1 to 11, wherein the aluminum alkyl is trimethylaluminum, triethylaluminum, tri-n-butylaluminum, triisobutylaluminum, tri-n-hexylaluminum, or tri-n-octylaluminum and mixtures thereof.
13. The catalyst system of any of paragraphs 1 to 12, wherein the aluminum alkyl, alumoxane or combination thereof is present at a molar ratio of Al:Cr of 1:10,000 to 10:1.
14. The catalyst system of any of paragraphs 1 to 13, wherein the metallocene compound has the formula:

(II)

wherein:
M is the metal center, and is a Group 4 metal preferably titanium, zirconium or hafnium, preferably zirconium or hafnium;
A can be present or absent and when present is selected from R$_1$R$_2$Si, R$_1$R$_2$C, (R$_1$R$_2$C)$_2$, (R$_1$R$_2$Si)$_2$, CH$_2$, CH$_2$CH$_2$, wherein R$_1$ and R$_2$ are independently selected from branched or unbranched C1 to C20 hydrocarbyl radicals, phenyl, and substituted phenyl, and when A is bridged, the catalyst represented can be a racemic or a meso form;
L$_1$ and L$_2$ are the same or different cyclopentadienyl, indenyl, tetrahydroindenyl or fluorenyl rings, optionally substituted, that are each bonded to M, or L$_1$ and L$_2$ are the same or different cyclopentadienyl, indenyl, tetrahydroindenyl or fluorenyl optionally substituted rings, in which any two adjacent R groups on the rings are optionally joined to form a substituted or unsubstituted, saturated, partially unsaturated, or aromatic cyclic or polycyclic substituent;
X$_1$ and X$_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.
15. The catalyst system of any of paragraphs 1 to 13, wherein the metallocene is Me$_2$Si(H$_4$Ind)$_2$ZrMe$_2$, Me$_2$Si(1,3-Me, Bu-Cp)$_2$ZrMe$_2$, Me$_2$Si(2-Me-Ind)$_2$ZrMe$_2$, Me$_2$Si(2-Me-4-Ph-Ind)$_2$Z-Me$_2$ or mixtures thereof.
16. A process to polymerize monomers comprising contacting monomers with a catalyst system (preferably the catalyst system of paragraph 1 to 15) comprising:
an aluminum alkyl, alumoxane or combinations thereof,
a first catalyst precursor prepared by contacting compound (I) represented by the formula:

(I)

with an optionally substituted alkyl or optionally substituted aryl alcohol;
wherein
Z—O is a support material, where O is oxygen and Z is Si, Ti, Al, Sn, Fe, Ga, Zr, B, Mg or Cr;
each X is, independently, nitrogen, oxygen phosphorous, or sulfur, provided that both X's are not each oxygen;
each n is, independently, 1 or 2, provided the total of n=3;
each R is, independently, an alkyl group, a substituted alkyl group, an aryl group, or a substituted aryl group, provided at least one R group is an aryl or substituted aryl group; and
a second catalyst precursor, wherein the second catalyst precursor is a metallocene compound.
17. The process of paragraph 16, wherein the aryl alcohol is a phenol or a biphenol and the phenol or biphenol is substituted with one or more fluorine atoms.
18. The process of paragraph 17, wherein the substituted phenol is pentafluorophenol and the substituted biphenol is —OC$_6$F$_4$C$_6$F$_5$.
19. The process of any of paragraphs 16 to 18, wherein each X is N.
20. The process of paragraph 19, wherein the aryl alcohol is biphenol and the biphenol is substituted with one or more fluorine atoms.
21. The process of paragraph 20, wherein the substituted biphenol is —OC$_6$F$_4$C$_6$F$_5$.
22. The process of any of paragraphs 16 through 21, wherein the monomers comprise ethylene.
23. The process of any of paragraphs 16 through 21, wherein the monomers comprise propylene.
24. The process of any of paragraphs 16 to 22, wherein the monomers further comprise at least one comonomer selected from the group consisting of propylene, butene-1, 4-methyl-pentene-1,3-methyl-pentene-1, hexene-1 and octene-1.
25. The process of paragraph 24, wherein the monomers further comprise at least one comonomer selected from the group consisting of ethylene, butene, pentene, hexene, heptene, octene, nonene, decene, dodecene, 4-methyl-pentene-1,3-methyl pentene-1, and 3,5,5-trimethyl-hexene-1.

26. The process of any of paragraphs 16 through 25, wherein the monomers further comprise a diene.

27. The process of paragraph 26, wherein the diene is selected from the group consisting of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, cyclopentadiene, vinyl-norbornene, norbornadiene, ethylidene norbornene, divinylbenzene, and dicyclopentadiene.

28. The process of paragraph 26, wherein the diene is present at from 0.00001 to 1.0 weight %, based upon the total weight of the composition.

29. The process of any of paragraphs 16 through 28, wherein the process is a slurry process.

30. The process of any of paragraphs 16 through 28, wherein the process is a gas phase process.

31. The process of any of paragraphs 16 through 28, wherein the process is a bulk phase process.

32. The process of any of paragraphs 16 through 28, wherein the aluminum alkyl is represented by the formula $Al(R'')_3$, where each R" is, independently, a C1 to C30 alkyl group.

33. The process of paragraph 32 wherein each R" is, independently, selected from the group consisting of methyl, ethyl, propyl, butyl, pentyl, hexyl, octyl, nonyl, decyl, undecyl, dodecyl, and all isomers thereof.

34. The process of any of paragraphs 15 through 33, wherein the aluminum alkyl is selected from the group consisting of trimethylaluminum, triethylaluminum, tri-n-butylaluminum, triisobutylaluminum, tri-n-hexylaluminum, or tri-n-octylaluminum and mixtures thereof.

35. The process of any of paragraphs 15 through 4, wherein the aluminum alkyl is present at a molar ratio of Al:Cr of 1:10,000 to 10:1.

36. The process of any of paragraphs 15 through 35, wherein the metallocene compound has the formula:

(II)

wherein:

M is the metal center, and is a Group 4 metal preferably titanium, zirconium or hafnium, preferably zirconium or hafnium;

A can be present or absent and when present is selected from $R_1R_2Si$, $R_1R_2C$, $(R_1R_2C)_2$, $(R_1R_2Si)_2$, $CH_2$, $CH_2CH_2$, wherein $R_1$ and $R_2$ are independently selected from branched or unbranched C1 to C20 hydrocarbyl radicals, phenyl, and substituted phenyl, and when A is bridged, the catalyst represented can be a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl optionally substituted rings, in which any two adjacent R groups on the rings are optionally joined to form a substituted or unsubstituted, saturated, partially unsaturated, or aromatic cyclic or polycyclic substituent;

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

37. The process of any of paragraphs 16 through 35, wherein the metallocene is $Me_2Si(H_4Ind)_2ZrMe_2$, $Me_2Si(1,3-Me, Bu-Cp)_2ZrMe_2$, $Me_2Si(2-Me-Ind)_2ZrMe_2$, $Me_2Si(2-Me-4-Ph-Ind)_2Z-Me_2$ or mixtures thereof

EXAMPLES

Toluene, tetrahydrofuran, fluorobenzene, diphenyl amine, and potassium hydride were purchased from Aldrich Chemical Company. Chromium trichloride was purchased from Strem. Grace Davison 948 silica was obtained from Grace Davison.

Synthesis of Supported Catalyst

1. $K(THF)_nN(C_6H_5)_2$ 30.0 grams of diphenylamine was dissolved into 300 mls of tetrahydrofuran. The solution was cooled to −35° C. 7.14 grams of potassium hydride was added via spatula in small portions over a period of several hours. After gas evolution ceased the solvent was removed, and the resulting solid was dried under vacuum overnight.

Figure 1:
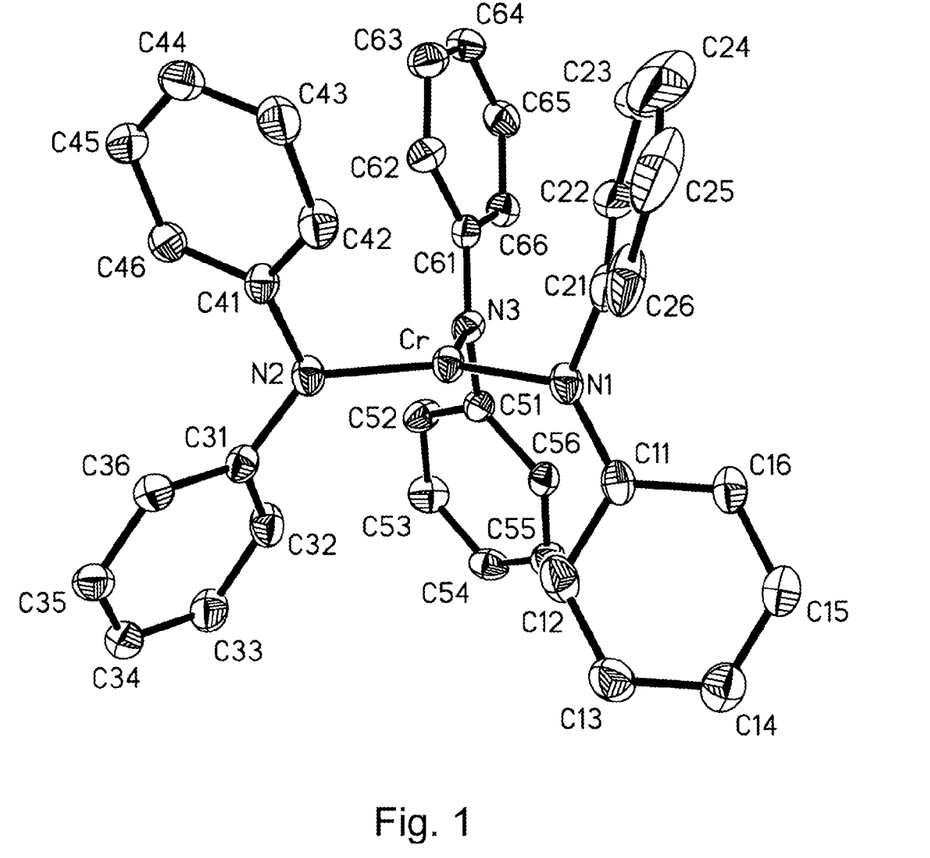
FIG. 1 is a representation of the compound produced in example 2.

2. $Cr(N(C_6H_5)_2)_3$ 0.03 grams of K(THF)nN$(C_6H_5)_2$ was dissolved into tetrahydrofuran (120 mls). The solution was cooled to −35° C. 1.91 grams of chromium trichloride was added to the reaction vessel. The resulting slurry was allowed to stir overnight at room temperature. The solvent was removed under vacuum. Approximately 150 mls of fluorobenzene was added to the solids and stirred for 30 minutes. The slurry was filtered and the dark almost black filtrate was dried under vacuum yielding 7 grams of black crystals. A single crystal X-ray diffraction study by (Ged Parkin, Dept. Chemistry Columbia University) revealed a trigonal planar Cr(III) species with Cr—N bond lengths determined Cr—N(1)=1.863(1), Cr—N(2)=1.856 (3), Cr—N(3)=1.855 (2) angstroms, see FIG. 1.

3. Supported Catalyst 1

30 grams of Grace-Davison 948 silica (calcined previously at 600° C.) was slurried into 250 mls of toluene. 6.4 grams of $Cr(N(C_6H_5)_2)_3$ was added to the slurry and the reaction is was heated to 100° C. overnight. After letting the reaction cool to room temperature, the slurry was filtered, rinsed with several 50 ml portions of toluene, and dried under vacuum yielding a free flowing black powder, 34 grams. The toluene filtrate was evaporated to dryness yielding 2.65 grams of solids containing diphenyl amine and some reactant.

4. Supported Catalyst 2

Supported Si—O—$Cr(OC_6F_4C_6F_5)_n$ 1.0 grams of supported catalyst 1 was slurried into 20 mls of toluene with 0.43 grams of perfluorobiphenol. The slurry was allowed to sit at room temperature overnight, after which the slurry was filtered rinsed with several 10 ml portions of toluene and dried under vacuum yielding a free flowing green powder (1.06 grams).

5. Supported Metallocene/Si—O—Cr(OC$_6$F$_4$C$_6$F$_5$ 45 mgs of supported catalyst 2 was slurried into 15 mls toluene. 2.5 micromoles of a metallocene was added. The slurry was allowed to sit overnight before use.

6. Supported Catalyst 3

2.0 grams of supported catalyst 1 was slurried into 20 mls of toluene with 0.48 grams of perfluorophenol. The slurry was allowed to sit at room temperature overnight, after which the slurry was filtered rinsed with several 10 ml portions of toluene and dried under vacuum yielding a free flowing green powder (2.2 grams).

Polymerizations Using Supported Catalysts

Experimental—Polymerizations:

In the following slurry phase experiments pressure is reported in atmospheres and pounds per square inch. The conversion factors to S.I. Units are; 1 psi equals 6.894757 kPa and 1 atm equals 101.325 kPa.

Feed and Co-Monomer

Polymerization grade ethylene was used and further purified by passing it through a series of columns: 500 cc Oxyclear cylinder from Labelear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. 98+% 1-hexene was obtained from Alfa-Aesar and further purified by filtration through basic alumina (Aldrich Chemical Company, Brockman Basic 1) into a vessel containing activated 3 Å molecular sieve.

Activator/Scavenger/Co-catalyst

Tri-n-octyl aluminum (TNOAL) was obtained from Akzo Chemicals, Inc. and used without further purification.

Polymerization grade hexane was used and further purified by passing it through a series of columns: 500 cc Oxyclear cylinder from Labelear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Reactor Description and Preparation

Polymerizations were conducted in an inert atmosphere (N$_2$) drybox using autoclaves equipped with an external heater for temperature control, glass inserts (internal volume of reactor=22.5 mL), septum inlets, regulated supply of nitrogen, hydrogen/nitrogen mixture, and ethylene, and equipped with disposable PEEK mechanical stirrers (400 RPM). The autoclaves were prepared by purging with dry nitrogen at 110° C. or 115° C. for 5 hours and then at 25° C. for 5 hours.

Ethylene/1-hexene Copolymerization: The reactor was prepared as described above, and then purged with ethylene. The reactors were heated to 40° C. and ethylene was first charged to the reactor.

A 4 micromolar solution of 1-hexene and scavenger/co-catalyst at room temperature and pressure was next added to the reactors via syringe. The reactors were then brought to process temperature (85° C.) while stirring at 400 RPM. Once at process temperature, ethylene delivery pressure for polymerization was set to the pressure generated by the components (ethylene, diluent, co-monomer, scavenger/co-catalyst) in the reactor.

0.3 milligrams of supported catalysts were stirred in toluene at ambient temperature and pressure and added to the reactors (at process temperature and pressure) via syringe as a slurry to initiate polymerization.

In the nature that solutions are added via syringe, a hexanes solution was also injected via the same syringe following their addition to insure that minimal solution was remaining in the syringe. This procedure was applied after the addition of the 1-hexene/activator solution as well as the catalyst slurry.

Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 400 psig O$_2$/Ar (5 mole % O$_2$) gas mixture to the autoclaves for approximately 30 seconds. The polymerizations were quenched after a predetermined cumulative amount of ethylene had been added or for a maximum of 45 minutes polymerization time. The reactors were cooled and vented. The polymer was isolated after the remaining reaction components were removed in-vacuo. Yields reported include total weight of polymer and residual catalyst. Yields are listed in Table 1.

Polymer Characterizations

GPC Method "C"—Gel Permeation Chromatography—Alliance 2000 DRI Only

This method used a Waters Alliance 2000 gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with 250 ppm of butylated hydroxy toluene (BHT). The flow rate used was 1.0 mL/min. Three (Polymer Laboratories) PLgel Mixed-B columns were used. This technique is discussed in "*Macromolecules*, Vol. 34, No. 19, pages 6812-6820", which is fully incorporated herein by reference.

The separation efficiency of the column set was calibrated using a series of narrow molecular weight distribution polystyrene standards, which reflects the expected molecular weight range for samples and the exclusion limits of the column set. At least 10 individual polystyrene standards, ranging from Mp ~580 to 10,000,000, were used to generate the calibration curve. The polystyrene standards were obtained from Polymer Laboratories (Amherst, Mass.) or an equivalent source. To assure internal consistency, the flow rate was corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (log Mp vs. retention volume) was generated by recording the retention volume at the peak in the DRI signal for each PS standard, and fitting this data set to a $2_{nd}$-order polynomial. Polystyrene standards were graphed using Viscotec 3.0 software. Samples were analyzed using WaveMetrics, Inc. IGOR Pro and Viscotec 3.0 software using updated calibration constants.

TABLE 1

Polymerization Data

| Catalyst | Mn | Mw | Mz | Mw/Mn | Mz/Mw | Yield grams PE, |
|---|---|---|---|---|---|---|
| Si—O—Cr(OC$_6$F$_4$C$_6$F$_5$)$_n$ 0.3 mgs | 7,468* | 315,537* | 1,838,608* | 42.25* | 5.83* | 0.1107 |
|  |  |  |  |  |  | 0.1122 |
|  |  |  |  |  |  | 0.108 |
| Si—O—Cr(OC$_6$F$_4$C$_6$F$_5$)$_n$/ (1,3-Me,nBuCp)$_2$Zr(Me)$_2$ | 9,631 | 401,206 | 1,297,704 | 41.66 | 3.23 | 0.0693 |
|  |  |  |  |  |  | 0.0785 |
|  |  |  |  |  |  | 0.0845 |
| Si—O—Cr(OC$_6$F$_4$C$_6$F$_5$)$_n$/ (nPrCp)$_2$ZrMe$_2$ | 9,591 | 445,708 | 1,501,933 | 46.47 | 3.37 | 0.0754 |
|  |  |  |  |  |  | 0.632 |
|  |  |  |  |  |  | 0.0733 |
| Si—O—Cr(OC$_6$F$_4$C$_6$F$_5$)$_n$/ rac-(CH$_3$)$_2$Si(H4Ind)$_2$Zr-Me$_2$ | 5,756 | 130,233 | 363,321 | 22.62 | 2.79 | 0.0982 |
|  |  |  |  |  |  | 0.1049 |
|  |  |  |  |  |  | 0.0953 |
| Si—O—Cr(OC$_6$F$_4$C$_6$F$_5$)$_n$/ rac-(CH$_3$)$_2$Si(4-Ph,2-MeInd)$_2$ZrMe$_2$ | 10,986 | 397,356 | 1,110,128 | 36.17 | 2.79 | 0.051 |
|  |  |  |  |  |  | 0.0493 |
|  |  |  |  |  |  | 0.059 |

Rxn. Conditions: 20 ml flask, 85° C.; 45 minutes: *59.5% of the sample was recovered after filtering through a 2 micron filter; hence GPC results only represents portion of sample that dissolved. Each experiment was run in triplicate. Yield refers to grams of polymer, PE.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A catalyst system comprising:
   an aluminum alkyl, alumoxane or combinations thereof;
   a first catalyst precursor prepared by contacting compound (I) represented by the formula:

(I)

with an substituted aryl alcohol;
   wherein
   Z—O is a support material, where O is oxygen and Z is Si, Ti, Al, Sn, Fe, Ga, Zr, B, Mg or Cr;
   each X is, independently, nitrogen, oxygen phosphorous, or sulfur, provided that both X's are not each oxygen;
   each n is, independently, 1 or 2, provided the total of n=3;
   each R is, independently, an alkyl group, a substituted alkyl group, an aryl group, or a substituted aryl group, provided at least one R group is an aryl or substituted aryl group; and
   a second catalyst precursor, wherein the second catalyst precursor is a metallocene compound.

2. The catalyst system of claim 1, wherein each X is N.

3. The catalyst system of claim 1, wherein each R is, independently, methyl, ethyl, propyl, butyl, isobutyl, hexyl, isohexyl, octyl, cyclohexyl, dodecyl, phenyl, substituted phenyl, naphthyl, substituted naphthyl, biphenyl, substituted biphenyl, diphenylether, substituted diphenylether, tolyl, substituted tolyl, benzophenone, substituted benzophenone, or a mixture thereof.

4. The catalyst system of claim 1, wherein each R is, independently, phenyl, substituted phenyl, naphthyl, or substituted naphthyl.

5. The catalyst system of claim 1, wherein the aryl alcohol is phenol or biphenol and the phenol or biphenol is substituted with one or more fluorine atoms.

6. The catalyst system of claim 5, wherein the substituted biphenol is —OC$_6$F$_4$C$_6$F$_5$.

7. The catalyst system of claim 1, wherein the alkyl alcohol or aryl alcohol is present in a molar excess.

8. The catalyst system of claim 1, wherein the aluminum alkyl is represented by the formula Al(R")$_3$, where each R" is, independently, a C$_1$ to C$_{30}$ alkyl group.

9. The catalyst system of claim 1, wherein the aluminum alkyl is trimethylaluminum, triethylaluminum, tri-n-butylaluminum, triisobutylaluminum, tri-n-hexylaluminum, or tri-n-octylaluminum and mixtures thereof.

10. The catalyst system of claim 1, wherein the metallocene compound has the formula:

(II)

wherein:
M is the metal center, and is a Group 4 metal preferably titanium, zirconium or hafnium, preferably zirconium or hafnium;
A can be present or absent and when present is selected from R$_1$R$_2$Si, R$_1$R$_2$C, (R$_1$R$_2$C)$_2$, (R$_1$R$_2$Si)$_2$, CH$_2$, CH$_2$CH$_2$, wherein R$_1$ and R$_2$ are independently selected from branched or unbranched C1 to C20 hydrocarbyl radicals, phenyl, and substituted phenyl, and when A is bridged, the catalyst represented can be a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl optionally substituted rings, in which any two adjacent R groups on the rings are optionally joined to form a substituted or unsubstituted, saturated, partially unsaturated, or aromatic cyclic or polycyclic substituent;

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

11. The catalyst system of claim 1, wherein the metallocene compound is $Me_2Si(H_4Ind)_2ZrMe_2$, $Me_2Si(1,3-Me, Bu-Cp)_2ZrMe_2$, $Me_2Si(2-Me-Ind)_2ZrMe_2$, $Me_2Si(2-Me-4-Ph-Ind)_2Z-Me_2$ or mixtures thereof.

12. A catalyst system consisting essentially of:
an aluminum alkyl;
a first catalyst precursor prepared by contacting compound (I) represented by the formula:

with an substituted aryl alcohol;
wherein
Z—O is a support material, where O is oxygen and Z is Si, Ti, Al, Sn, Fe, Ga, Zr, B, Mg or Cr;
each X is, independently, nitrogen, oxygen, phosphorous, or sulfur, provided that both X's are not each oxygen;
each n is, independently, 1 or 2, provided the total of n=3;
each R is, independently, an alkyl group, a substituted alkyl group, an aryl group, or a substituted aryl group, provided at least one R group is an aryl or substituted aryl group; and
a second catalyst precursor, wherein the second catalyst precursor is a metallocene compound having the formula:

wherein:
M is the metal center, and is a Group 4 metal preferably titanium, zirconium or hafnium, preferably zirconium or hafnium;
A can be present or absent and when present is selected from $R_1R_2Si$, $R_1R_2C$, $(R_1R_2C)_2$, $(R_1R_2Si_2$, $CH_2$, $CH_2CH_2$, wherein $R_1$ and $R_2$ are independently selected from branched or unbranched C1 to C20 hydrocarbyl radicals, phenyl, and substituted phenyl, and when A is bridged, the catalyst represented can be a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl optionally substituted rings, in which any two adjacent R groups on the rings are optionally joined to form a substituted or unsubstituted, saturated, partially unsaturated, or aromatic cyclic or polycyclic substituent;

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

13. A process to polymerize monomers comprising contacting monomers with a catalyst system comprising:
an aluminum alkyl, alumoxane or combinations thereof;
a first catalyst precursor prepared by contacting compound (I) represented by the formula:

with substituted aryl alcohol;
wherein
Z—O is a support material, where O is oxygen and Z is Si, Ti, Al, Sn, Fe, Ga, Zr, B, Mg or Cr;
each X is, independently, nitrogen, oxygen phosphorous, or sulfur, provided that both X's are not each oxygen;
each n is, independently, 1 or 2, provided the total of n=3;
each R is, independently, an alkyl group, a substituted alkyl group, an aryl group, or a substituted aryl group, provided at least one R group is an aryl or substituted aryl group; and
a second catalyst precursor, wherein the second catalyst precursor is a metallocene compound.

14. The process of claim 13, wherein the aryl alcohol is a phenol or a biphenol and the phenol or biphenol is substituted with one or more fluorine atoms.

15. The process of claim 13, wherein each X is N.

16. The process of claim 13, wherein the monomers comprise ethylene.

17. The process of claim 13, wherein the monomers comprise propylene.

18. The process of claim 14, wherein the monomers further comprise at least one comonomer selected from the group consisting of propylene, butene-1,4-methyl-pentene-1,3-methyl-pentene-1, hexene-1 and octene-1.

19. The process of claims 18, wherein the monomers further comprise a diene.

20. The process of claim 19, wherein the diene is selected from the group consisting of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, cyclopentadiene, vinylnorbornene, norbornadiene, ethylidene norbornene, divinylbenzene, and dicyclopentadiene.

21. The process of claim 19, wherein the diene is present at from 0.00001 to 1.0 weight %, based upon the total weight of the composition.

22. The process of claim 13, wherein the aluminum alkyl is represented by the formula Al(R")$_3$, where each R" is, independently, a $C_1$ to $C_{30}$ alkyl group.

23. The process of claim 21, wherein each R" is, independently, selected from the group consisting of methyl, ethyl, propyl, butyl, pentyl, hexyl, octyl, nonyl, decyl, undecyl, dodecyl, and all isomers thereof.

24. The process of claim 12, wherein the aluminum alkyl is selected from the group consisting of trimethylaluminum, triethylaluminum, tri-n-butylaluminum, triisobutylaluminum, tri-n-hexylaluminum, or tri-n-octylaluminum and mixtures thereof.

25. The process of claim 13, wherein the metallocene compound has the formula:

(II)

wherein:
M is the metal center, and is a Group 4 metal preferably titanium, zirconium or hafnium, preferably zirconium or hafnium;
A can be present or absent and when present is selected from $R_1R_2S$, $R_1R_2C$, $(R_1R_2C)_2$, $(R_1R_2Si)_2$, $CH_2$, $CH_2CH_2$, wherein $R_1$ and $R_2$ are independently selected from branched or unbranched C1 to C20 hydrocarbyl radicals, phenyl, and substituted phenyl, and when A is bridged, the catalyst represented can be a racemic or a meso form;
$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl optionally substituted rings, in which any two adjacent R groups on the rings are optionally joined to form a substituted or unsubstituted, saturated, partially unsaturated, or aromatic cyclic or polycyclic substituent;
$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

26. The process of claim 13, wherein the metallocene compound is $Me_2Si(H_4Ind)_2ZrMe_2$, $Me_2Si(1,3-Me,Bu-Cp)_2ZrMe_2$, $Me_2Si(2-Me-Ind)_2ZrMe_2$, $Me_2Si(2-Me-4-Ph-Ind)_2Z-Me_2$ or mixtures thereof.

27. A process to polymerize monomers comprising contacting monomers with a catalyst system consisting essentially of:
an aluminum alkyl;
a first catalyst precursor prepared by contacting compound (I) represented by the formula:

(I)

with substituted aryl alcohol;
wherein
Z—O is a support material, where O is oxygen and Z is Si, Ti, Al, Sn, Fe, Ga, Zr, B, Mg or Cr;
each X is, independently, nitrogen, oxygen phosphorous, or sulfur, provided that both X's are not each oxygen;
each n is, independently, 1 or 2, provided the total of n=3;
each R is, independently, an alkyl group, a substituted alkyl group, an aryl group, or a substituted aryl group, provided at least one R group is an aryl or substituted aryl group; and
a second catalyst precursor, wherein the second catalyst precursor is a metallocene compound having the formula:

(II)

wherein:
M is the metal center, and is a Group 4 metal preferably titanium, zirconium or hafnium, preferably zirconium or hafnium;
A can be present or absent and when present is selected from $R_1R_2Si$, $R_1R_2C$, $(R_1R_2C)_2$, $(R_1R_2Si)_2$, $CH_2$, $CH_2CH_2$, wherein $R_1$ and $R_2$ are independently selected from branched or unbranched C1 to C20 hydrocarbyl radicals, phenyl, and substituted phenyl, and when A is bridged, the catalyst represented can be a racemic or a meso form;
$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl optionally substituted rings, in which any two adjacent R groups on the rings are optionally joined to form a substituted or unsubstituted, saturated, partially unsaturated, or aromatic cyclic or polycyclic substituent;
$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

* * * * *